(12) United States Patent
Khalafaghian (10) Patent No.: US 12,378,944 B2
(45) Date of Patent: Aug. 5, 2025

(54) METHOD OF SUPPORTING SHEAR WEBS OF A WIND TURBINE BLADE

(71) Applicant: LM WIND POWER A/S, Kolding (DK)

(72) Inventor: Mgo Mike Khalafaghian, Cherbourg en Contentin (FR)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/575,808

(22) PCT Filed: Jun. 29, 2022

(86) PCT No.: PCT/EP2022/067941
§ 371 (c)(1),
(2) Date: Dec. 29, 2023

(87) PCT Pub. No.: WO2023/275166
PCT Pub. Date: Jan. 5, 2023

(65) Prior Publication Data
US 2024/0151206 A1 May 9, 2024

(30) Foreign Application Priority Data
Jun. 30, 2021 (EP) .................................. 21182798

(51) Int. Cl.
*F03D 1/06* (2006.01)
*B29D 99/00* (2010.01)

(52) U.S. Cl.
CPC ....... *F03D 1/0675* (2013.01); *B29D 99/0028* (2013.01); *F05B 2230/20* (2013.01)

(58) Field of Classification Search
CPC .... F03D 1/0675; F03D 1/0679; F03D 1/0684; F03D 1/0685; F05B 2230/20;
(Continued)

(56) References Cited

U.S. PATENT DOCUMENTS 7,988,416 B2 * 8/2011 Westergaard ........... F03D 80/00
416/500
10,273,934 B2 * 4/2019 Jensen .................... B23P 6/002
(Continued)

FOREIGN PATENT DOCUMENTS

CN 109514878 A 3/2019
EP 3960428 A1 * 3/2022 ......... B29C 65/4835
WO 2018/184644 A1 10/2018

*Primary Examiner* — Sang K Kim
(74) *Attorney, Agent, or Firm* — Nath, Goldberg & Meyer; Tanya E. Harkins

(57) ABSTRACT

The present invention relates to a method of manufacturing a wind turbine blade (10). The method comprises arranging one or more shear webs (50, 55, 70) within a first shell half, adhesively joining the one or more shear webs to the first shell half, and adhesively joining the second shell half to the first shell half and to the one or more shear webs. The step of arranging the one or more shear webs within the first shell half comprises arranging at least one telescopic support member (80) between the inside surface (38*b*) of the first shell half (38) and the lateral surface (62) of at least one of the shear webs (70), wherein the telescopic support member (80) comprises an actuator (82) for adjusting the length of the telescopic support member.

16 Claims, 6 Drawing Sheets a)

b)

(58) Field of Classification Search
CPC ............ F05B 2240/301; F05B 2240/31; F05B 2260/30; B29D 99/0028; B29D 99/0025; B29L 2031/085
See application file for complete search history.

(56) References Cited

U.S. PATENT DOCUMENTS

| | | | | |
|---|---|---|---|---|
| 10,677,222 | B2* | 6/2020 | Warchol | B29C 70/541 |
| 11,433,632 | B2* | 9/2022 | Thomsen | B29C 66/636 |
| 11,667,087 | B2* | 6/2023 | Nielsen | B29C 66/543 |
| | | | | 156/60 |
| 2006/0002794 | A1* | 1/2006 | Moroz | F03D 7/0228 |
| | | | | 416/48 |
| 2011/0176928 | A1* | 7/2011 | Jensen | F03D 3/062 |
| | | | | 416/233 |
| 2017/0320276 | A1* | 11/2017 | Pedersen | B29C 70/026 |
| 2021/0102523 | A1* | 4/2021 | Smith | B29C 66/112 |
| 2022/0228552 | A1* | 7/2022 | Smith | B29C 65/48 |

* cited by examiner

METHOD OF SUPPORTING SHEAR WEBS OF A WIND TURBINE BLADE

This is a National Phase Application filed under 35 U.S.C. 371 as a national stage of PCT/EP2022/067941, filed Jun. 29, 2022, an application claiming the benefit of European Application No. 21182798.5, filed Jun. 30, 2021, the content of each of which is hereby incorporated by reference in its entirety.

FIELD OF THE INVENTION

The present invention relates to a method of manufacturing a wind turbine blade which involves arranging one or more shear webs within the blade shell.

BACKGROUND OF THE INVENTION

Wind power provides a clean and environmentally friendly source of energy. Modern wind turbines usually comprise a tower, generator, gearbox, nacelle, and one or more rotor blades. The wind turbine blades capture kinetic energy of wind using known foil principles. Modern wind turbines may have rotor blades that exceed 90 meters in length.

Wind turbine blades are usually manufactured by forming two shell parts from layers of woven fabric and resin. Spar caps or main laminates are placed or integrated in the shell parts and are combined with shear webs to form a structural support member. Spar caps or main laminates may be joined to, or integrated within, the inside of the suction and pressure halves of the shell. The shear webs and spar caps or main laminates typically extend spanwise along the inside of the blade and are often I-shaped. An additional trailing edge shear web may also be incorporated into the blade.

The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may have a C-shaped or I-shaped cross-section. For very long blades, the blade shells may further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

The shear webs act to reinforce the blade structure and prevent excessive bending or buckling. Some blade designs use shear webs formed from beam members having I- or C-shaped cross-sections, the members having a main body with load-bearing flanges extending therefrom at opposed ends of the main body.

As the size of wind turbines increases, the manufacturing and assembly of blade parts, such as the shell body and shear webs, becomes more challenging and costly. During a typical blade manufacturing process, one or more shear webs are bonded to the inner surfaces of the two shell halves, wherein the shear webs have to be lifted into one of the shell halves and positioned with their lower mounting flanges on top of the spar cap or main laminate, wherein usually an adhesive is applied between the main laminate and the lower mounting flange. In this process, shear webs need to be supported during arrangement and bonding, for example by joining the main shear web to an auxiliary shear web, and by using various support structures.

WO 2017/045690 A1 relates to a positioning jig for manufacturing a wind turbine blade wherein the positioning jig is secured to a shear web prior to its introduction into a blade shell half. A reference surface of the positioning jig engages with a locating surface on the outside of the blade mould for placing the positioning jig into its guide position with the shear web.

WO 2018/184644 A1 discloses a method of assembling two half shells of a wind turbine blade in respective mould halves, and arranging one of the half shells on top of the other half shell with a shear web arranged between the two half shells. During the join-up process, the shear web is supported by stabilisers, wherein stabilisers attached to an inboard end of the shear web may remain accessible after the join-up and can be removed.

When using such known support structures, the supported shear webs should remain upright during the blade closing process. However, given the slanted surface of the shell and the mass of the webs, some of the above-discussed arrangements were found to be non-optimal as the shear webs tend to lean on the supportive poles or beams, thus not remaining vertical, i.e. at an angle of 90° with respect to ground. This may lead to inconsistent bond lines, including comparatively thick glue lines between the web flanges and the shell. However, ideally the thickness of bond lines should be around 3-11 mm. Also, using some these known support structures was found to result in insufficient bond line width and/or situations in which the mounting flange of the shear web is not, or not fully, in contact with the inside surface of the shell part.

It is therefore an object of the present invention to provide a method of manufacturing a wind turbine blade with an easier and more cost-efficient arrangement of shear webs within the blade shell.

It is another object of the present invention to provide a method of manufacturing a wind turbine blade which is flexible and allows for effective adjustment to different sizes and types of blades and shear webs.

It is another object of the present invention to provide a method of manufacturing a wind turbine blade which reduces or prevents the misaligned of shear webs relative to the inside shell surface and which improves the quality and reproducibility of bond lines between shear webs and the inside blade surface.

SUMMARY OF THE INVENTION

It has been found that one or more of the aforementioned objects can be obtained by a method of manufacturing a wind turbine blade, the blade having a profiled contour including a pressure side and a suction side, and a leading edge and a trailing edge with a chord having a chord length extending therebetween, the wind turbine blade extending in a spanwise direction between a root end and a tip end, the method comprising the steps of:
  forming a first shell half and a second shell half, each shell half comprising an aerodynamic outside surface and an opposing inside surface, arranging one or more shear webs within the first shell half, wherein each shear web comprises two opposing lateral surfaces extending in a spanwise direction, adhesively joining the one or more shear webs to the first shell half, and adhesively joining the second shell half to the first shell half and to the one or more shear webs, wherein the step of arranging the one or more shear webs within the first shell half comprises arranging at least one support member, preferably telescopic support member, between the inside surface of the first shell half and the lateral surface of at least one of the shear webs, preferably by releasably fastening a first end of the support member to the inside surface of the first shell half and releasably fastening a second end of the support member to the lateral surface of at least one of the shear webs, wherein the support member comprises an actuator for adjusting the length of the support member. In some embodiments, support members are arranged between the inside surface of the first shell half and the lateral surface of at least two of the shear webs, of at least three of the shear webs, or of all shear webs.

It was found that this provides an effective solution for maintaining and regulating the perpendicularity of the shear webs in the blade manufacturing process. The support member will support the load of the shear web during the closing and bonding operations. The arrangement of the present invention helps to reduce the gap between the web mounting flanges and the inside surface of the shell, hence providing an improved control of the bond line thickness.

In a particularly preferred embodiment, the support member is a telescopic support member.

The blade shell halves will typically be made of a fibre-reinforced polymer material, usually comprising glass and/or carbon fibres, as well as sandwich material. The shell halves will usually be manufactured in blade moulds using fibre lay-up and resin infusion methods, such as VARTM. In some embodiments, the first shell half is the suction side shell half. In other embodiments, the first shell half is the pressure side shell half.

The opposing lateral surfaces of the shear web are usually the main and largest surface of the shear web. When placed within the shell, one of the two lateral surfaces will usually face towards the leading edge, whereas the opposing lateral surface will usually face towards the trailing edge of the blade. The lateral surface usually lies in a substantially vertical plane including the longitudinal axis or spanwise extent of the shear web. Thus, the two opposing lateral surfaces of the shear web usually extend parallel to the spanwise direction, when the shear is installed within the blade. The opposing lateral surfaces of the shear web can also be expressed as a left lateral surface and a right lateral surface as seen from the root end of blade looking towards the tip end of the blade.

Usually, at least two shear webs will be arranged within the first shell half, such as a forward shear web, which is closer to the leading edge, and an aft shear web, which is closer to the trailing edge. In a preferred embodiment, a first shear web and a second shear web are arranged within the first shell half, the first and second shear web being releasably interconnected, preferably by a truss placed in between the first and second shear web. In a preferred embodiment, at least three shear webs are arranged within the first shell half, including a first shear web arranged closest to the leading edge, a third shear web arranged closest to the trailing edge, and a second shear web arranged between the first and the third shear web, wherein the at least one telescopic support member is arranged between the inside surface of the first shell half and the lateral surface of the third shear web.

The shear webs of the present invention can be substantially I-shaped. Alternatively, the shear webs may be substantially C-shaped. Each shear web will typically comprise a core member which will usually comprise a foamed polymer and/or balsa wood. The shear webs may also comprise web skins that will typically comprise glass fibres, aramid fibres, carbon fibres or combinations thereof. Preferably, the web skins comprise, or consists of, glass fibres. Typically, the shear web is an elongated element. The shear web body is usually an elongated body that—when mounted in the wind turbine blade shell—extends in the longitudinal or spanwise direction of the wind turbine blade.

It is preferred that the shear webs are arranged substantially parallel to the longitudinal axis of the shell body, i.e. substantially along a spanwise direction. The shear webs will typically be manufactured using a shear web mould system comprising a central moulding portion for forming at least a part of the web body, a first moulding plate for forming at least a part of the first web foot flange, and a second moulding plate for forming at least a part of the second web foot flange. It is preferred that the shear webs of the present invention are manufactured via a Vacuum Assisted Resin Transfer Moulding (VARTM) process. Alternatively, an RTM process could be used, wherein resin is injected into the mould cavity by use of over-pressure.

Thus, typically each shear web comprises two opposing lateral surfaces extending in a spanwise direction in between a first mounting flange and a second mounting flange. An adhesive or bonding paste is usually applied to the mounting flanges and/or to the predetermined shear web mounting regions on the inside surface of the shell halves, such as main laminates or spar caps, for bonding the shear web in between the shell halves. Thus, the step of arranging one or more shear webs within the first shell half preferably includes applying an adhesive to one or both mounting flanges of the shear web and/or to the shear web mounting regions on the inside surface of the shell halves. Once the adhesive has been applied to these surfaces, the shear webs can be lifted into the first shell half and the lower mounting flanges of the shear webs are positioned against the inside surface of the first shell half in the shear web mounting region.

The steps of adhesively joining the one or more shear webs to the first shell half, and adhesively joining the second shell half to the first shell half and to the one or more shear webs will usually comprise providing adhesive between a web foot or mounting flange of the shear web(s) and the inside surface of the first shell half for bonding the shear web(s) to the first shell half. Subsequently adhesive can be provided between an opposing web foot or mounting flange of the shear web(s) and the inside surface of the second shell half, wherein the parts are joined together by arranging the second shell half on top of the first shell half whilst simultaneously bonding the shear web(s) to the second shell halves.

The pressure side shell half and the suction side shell half will typically be adhered or bonded to each other near the leading edge and near the trailing edge. The shell body may comprise longitudinally/spanwise extending load carrying structures, such as one or more main laminates or spar caps. Advantageously, the shear web is arranged along such main laminate or spar cap.

Load carrying structures such as main laminates are typically formed as fibre insertions comprising a plurality of fibre reinforcement layers, for example, between 20 and 50 layers. In a preferred embodiment, the blade comprises spar caps provided along the respective first and second shell halves. On each side of the load carrying structure, the blade typically comprises a sandwich structure with a core material, such as balsa wood or foamed polymer, and with an inner and outer skin made of fibre reinforced polymer. The shell body is typically made of a fibre reinforced polymer material. The reinforcement fibres may for instance be glass fibres, carbon fibres, aramid fibres, metallic fibres, such as steel fibres, or plant fibres, whereas the polymer for instance may be epoxy, polyester or vinyl ester.

In a preferred embodiment, each shear web comprises a web body, a first mounting flange at a first end of the web body, and a second mounting flange at a second end of the web body, wherein the two opposing lateral surfaces of the shear web are formed by the web body. According to another embodiment, the web body comprises a first web skin and a second web skin, each web skin comprising one or more fibre layers, and a core member sandwiched in between the first and second web skins.

Preferably, more than one telescopic support member is releasably fastened to the lateral surface of the shear web, such as the trailing edge shear web. Preferably, at least two telescopic support members, such as at least five, or at least ten telescopic support members, are releasably fastened to the lateral surface of the shear web, spaced apart in the spanwise direction. According to an advantageous embodiment, the telescopic support members are arranged such that they can push the shear web towards the trailing edge of the blade by extending the respective lengths of the support members.

Thus, in a preferred embodiment, the shear web is biased towards the trailing edge of the blade using the actuators of the respective telescopic support members.

According to a particularly preferred embodiment, the method includes a step of adjusting, preferably increasing, the length of the telescopic support member using said actuator, prior to, or during, the steps of adhesively joining the one or more shear webs to the first shell half, and adhesively joining the second shell half to the first shell half and to the one or more shear webs. Thus, the shear web can be aligned properly, such as establishing a substantially vertical orientation, by using the pushing force exerted by the telescopic support member against the lateral surface of the shear web.

A first end, or proximal end, of the telescopic support member can be releasably fastened to the inside surface of the first shell half and a second end, or a distal end, of the telescopic support member can be releasably fastened to the lateral surface of at least one of the shear webs. In a preferred embodiment, the step of arranging at least one telescopic support member between the inside surface of the first shell half and the lateral surface of the shear web comprises releasably fastening each telescopic support member, preferably a free end thereof, such as the distal end thereof, to the lateral surface of the shear web. In some embodiments, the telescopic support members are only releasably fastened to one of the two lateral surfaces of the shear web, preferably the lateral surface which faces toward the leading edge of the blade.

The step of arranging the one or more shear webs within the first shell half preferably comprises fixing at least one telescopic support member to one or more anchoring points on the inside surface of the first shell half, the telescopic support member comprising a free end for engaging with a lateral surface of the shear web. In a particularly preferred embodiment, the telescopic support member remains fixed to the one or more anchoring points on the inside surface of the first shell half during the step of adhesively joining the second shell half to the first shell half and to the one or more shear webs.

Typically, the telescopic support member comprises a free distal end for engaging with a lateral surface of the shear web, and a proximal end that can be fixed to an anchoring point on the inner surface of the shell half. In this context, the terms distal and proximal are as seen from the inside surface of the first shell half towards the lateral surface of the shear web, i.e. the distal end being further apart from the inside surface of the first shell half than the proximal end.

It is preferred that the actuator of the telescopic support member is a linear actuator, preferably a pneumatic cylinder, most preferably a pneumatic double-acting cylinder. In a preferred embodiment, the actuator is a fluid-driven actuator, preferably a pneumatic cylinder. In a particularly preferred embodiment, each fluid-driven actuator is linked to a fluid supply line, preferably an air supply line. In other embodiments, the linear actuator may be a hydraulic cylinder. Independent of the choice of the actuator, it is preferred that the support member is a telescopic support member.

The fluid supply line may be connected to a supply of fluid, preferably a source of compressed air, such as an air compressor or a control stand connected to an air supply. In some embodiments, the air compressor may be located outside the blade. Thus, the actuators of the respective telescopic support members may be operable from outside of the blade. In a particularly preferred embodiment, the movement of the actuators of the respective telescopic support members is synchronized between all actuators.

Each actuator, such as each pneumatic cylinder, preferably comprises a piston rod having a free end, usually the distal end of the actuator. The free end of the piston rod may advantageously comprise a shaft or pin, which is preferably oriented perpendicular to the length extension of the actuator, which can be received in a suitable attachment device, such as an attachment eye, ring or hook, on the lateral surface of shear web.

The steps of adhesively joining the one or more shear webs to the first shell half, and adhesively joining the second shell half to the first shell half and to the one or more shear webs can be carried out substantially simultaneously during and after closing the shell, i.e. after placing the second shell half onto the first shell half. In the step of adhesively joining the second shell half to the first shell half, the adhesive between the respective shell halves and the adhesive between the shear web mounting flanges and the shell halves is typically squeezed at these respective interfaces through the weight of the second shell half. According to the present invention, at least one of the shear webs, preferably the trailing edge shear web is pushed towards the trailing edge by means of the telescopic support member. The adhesive can then be left to cure/harden.

In a particularly preferred embodiment, the mounting flanges of the shear web are converging towards the trailing edge. Thus, it is preferred that the telescopic support members are releasably fastened to a lateral surface of a shear web, preferably the lateral surface facing towards the leading edge of the blade, the shear web comprising first and second mounting flanges, such as upper and lower mounting flanges, which converge towards the trailing edge, as seen in the chordwise direction. In other words, the vertical or flapwise distance between the mounting flanges decrease when moving in a chordwise direction towards the trailing edge. In such embodiments, the telescopic support members of the present invention may efficiently press the converging mounting flanges against the respective mounting regions on the inside shell surface, which are preferably likewise converging towards the trailing edge.

Preferably, the support member comprises a foot portion and a bar portion, wherein the actuator is arranged distally adjacent to the bar portion. The bar portion may comprise a rigid elongate element which is generally bar-shaped or rod-shaped. The foot portion may comprise a base, optionally including attachment means such as a hook, loop, attachment eye or the like, for releasable attachment of the support member to the inside shell surface.

In a preferred embodiment, distance plugs are arranged on one or both of the mounting flanges of the shear web. This helps to ensure a minimum bond line thickness.

The length of the telescopic support member in its retracted configuration may advantageously correspond to the distance between the anchor point on the inside shell surface and the fixation point on the shear web body. To correct/rectify any undesired tilting effect prior to or during the closing step, the pneumatic system can be activated to push the mounting flange of the shear web to its correct position, reducing the gap between the web flange and the inner shell surface.

According to a particularly preferred embodiment, the support member is a pneumatically-actuated support pole. Once the shell halves of the blade are closed, an operator may activate the pneumatic actuator, pushing the mounting flange of the shear web to its predetermined position, hence insuring an acceptable gap between the web flange and the inside surface of the shell.

In a preferred embodiment, the step of adhesively joining the second shell half to the first shell half and to the one or more shear webs comprises increasing the length of the telescopic support member for applying a force on the lateral surface of the shear web.

In a preferred embodiment, by extending the length of the telescopic support members after they are releasably fastened between the inside shell surface and the lateral shear web surface, a force is exerted on the lateral web surface biasing the same towards the trailing edge of the blade. It is thus preferred that said force pushes the shear web in a chordwise direction towards the trailing edge of the blade.

In a preferred embodiment, a plurality of shear webs is arranged within the first shell half, and wherein the at least one telescopic support member extends between the inside surface of the first shell half and the lateral surface of the shear web which is closest to the trailing edge of the blade among said plurality of shear webs.

According to an advantageous embodiment, three shear webs and a substantially C-shaped stiffener are arranged within the first shell half, including a first shear web arranged closest to the leading edge, a second shear web arranged next to the first shear web in a chordwise direction closer to the trailing edge, a third shear web arranged next to the second shear web in a chordwise direction closer to the trailing edge, the substantially C-shaped stiffener being arranged next to the third shear web in a chordwise direction closer to the trailing edge, wherein the at least one telescopic support member is arranged between the inside surface of the first shell half and the lateral surface of the third shear web and/or wherein the at least one telescopic support member is arranged between the inside surface of the first shell half and the lateral surface of the C-shaped stiffener.

In a preferred embodiment, the at least one telescopic support member is arranged in contact with the inside surface of the first shell half at a location spaced in a chordwise direction from said shear web which is closest to the trailing edge of the blade, such that said location is closer to the leading edge than said shear web.

In a preferred embodiment, method further comprising removing the support member from the shear web after adhesively joining the second shell half to the first shell half and to the one or more shear webs In a preferred embodiment, the one or more anchoring points on the inside surface of the first shell half comprise a polymer anchor glued to the inside surface of the first shell half, the polymer anchor comprising a loop for receiving a mating pin of the telescopic support member.

In a preferred embodiment, the at least one telescopic support member is arranged only on one of the two opposing lateral surfaces of the shear web, namely the lateral surface of the shear web that faces towards the leading edge of the blade.

In a preferred embodiment, the point of contact between the telescopic support member and the lateral surface of the shear web is at the center of gravity of the shear web or higher. In other words, it is preferred that when the shear web is arranged within the first shell half, the distal end of the telescopic support member is releasably fastened to the lateral surface of the shear web at or above the midpoint of said lateral surface, as seen in the vertical/flapwise direction. Typically, the telescopic support members are only fastened to the first shell half, and not to the second shell half.

In a preferred embodiment, the telescopic support member further comprises a regulator for associating the length of the telescopic support member with an angle of the shear web with a horizontal plane.

In another aspect, the present invention relates to a wind turbine blade comprising: a first shell half and a second shell half joined together and defining an internal cavity therebetween, each shell half comprising an aerodynamic outside surface and an opposing inside surface, one or more shear webs arranged in the internal cavity, wherein each shear web comprises two opposing lateral surfaces extending in a spanwise direction, at least one removable telescopic support member arranged between the inside surface of the first shell half and the lateral surface of at least one of the shear webs, wherein the support member comprises an actuator for adjusting the length of the telescopic support member.

In a preferred embodiment, the at least one removable telescopic support member is attached to an inboard portion of the shear web that is accessible from a root end of the blade.

In a preferred embodiment, the telescopic support members are removed after adhesively joining the second shell half to the first shell half and to the one or more shear webs. It is further preferred that three or more telescopic support members are fastened to the same lateral surface, e.g. a right lateral surface, preferably the lateral surface facing toward the leading edge of the blade, of the shear web, such as a trailing edge shear web, preferably arranged successively in a spanwise direction.

The present invention also relates to a wind turbine blade obtainable by the method of the present invention. Such wind turbine blade is characterized by improved bond lines between the shear webs and the inside surface of the shell due to method of the present invention.

In another aspect, the present invention relates to a shear web assembly comprising a shear web having two opposing lateral surfaces, the shear web assembly further comprising at least one removable telescopic support member releasably attached to one of the lateral surfaces of the shear web, wherein the support member comprises an actuator for adjusting the length of the telescopic support member.

All features and/or embodiments discussed above with respect to the method of the present invention, apply likewise to the wind turbine blade and to the shear web assembly according to the present invention.

As used herein, the term "spanwise" is used to describe the orientation of a measurement or element along the blade from its root end to its tip end. The term "chord-wise" is used to describe the orientation of an element or measurement along the blade from its leading edge to its trailing edge. As used herein, the term "telescopic" is intended to mean the ability of a component, such as the support member, to be extended and retracted in length.

DESCRIPTION OF THE INVENTION

The invention is explained in detail below with reference to an embodiment shown in the drawings, in which.

DETAILED DESCRIPTION

Figure 1:
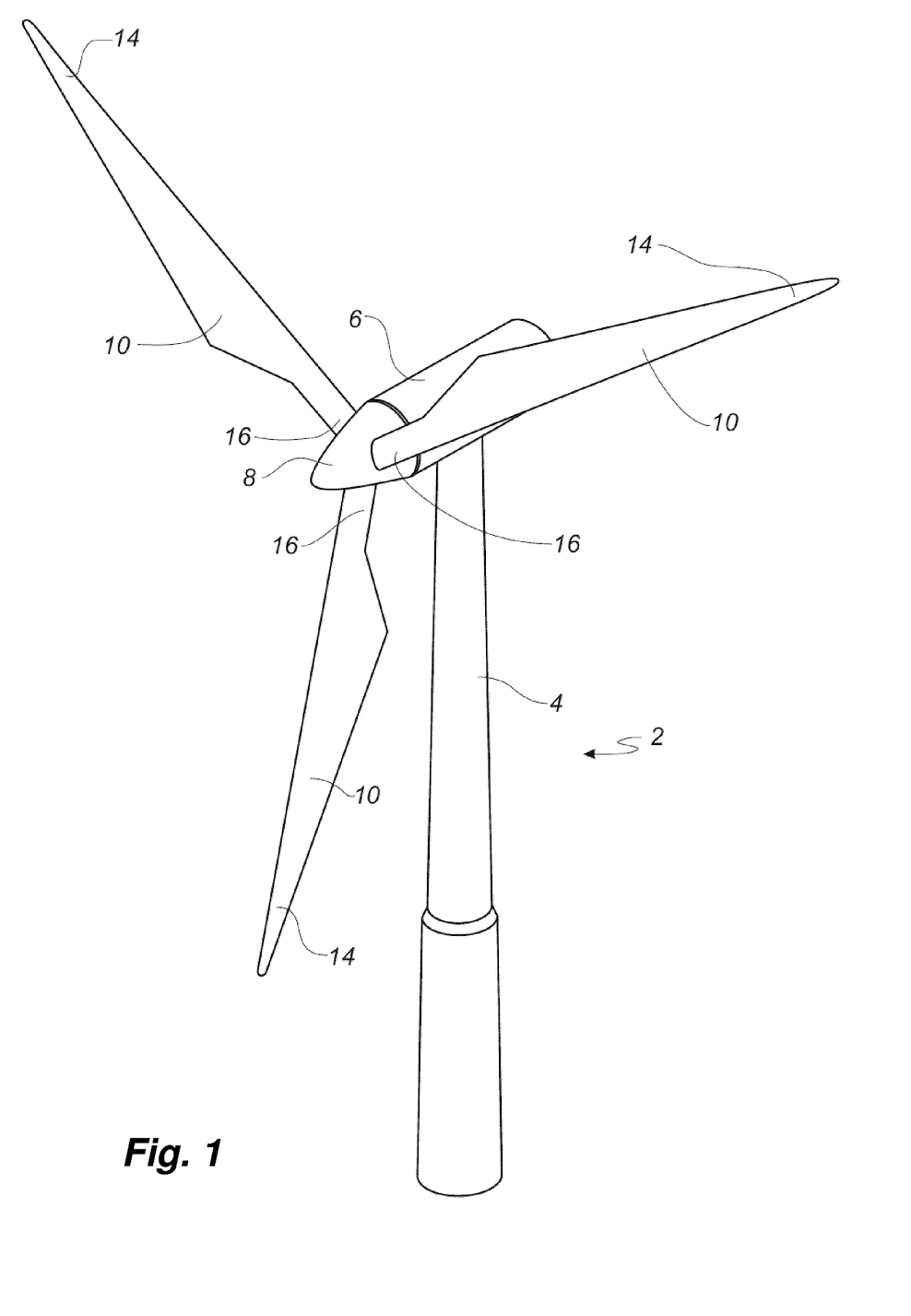
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
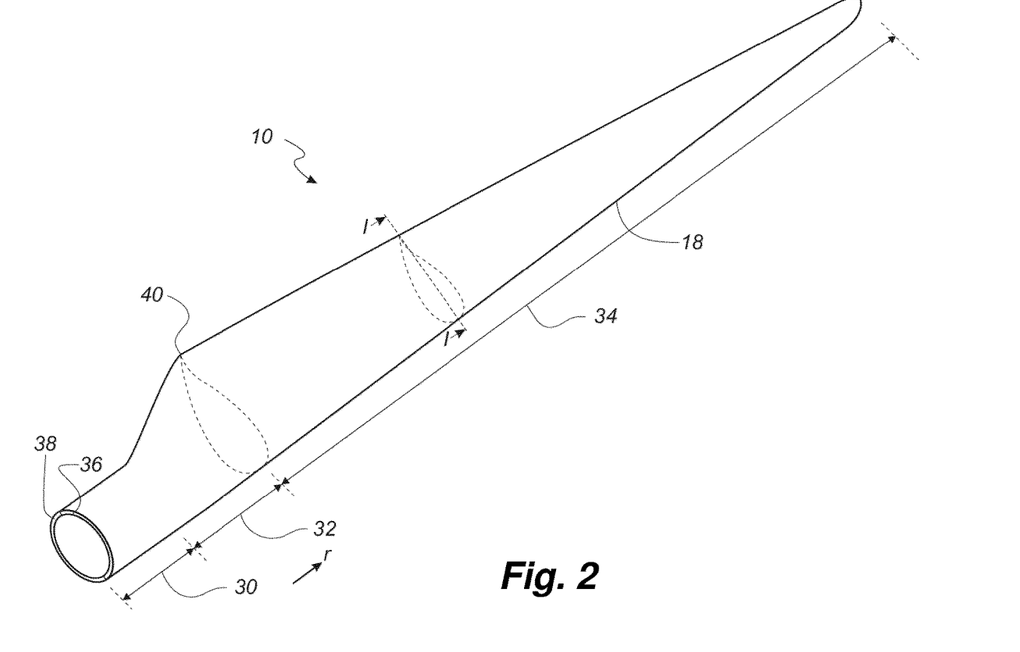
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
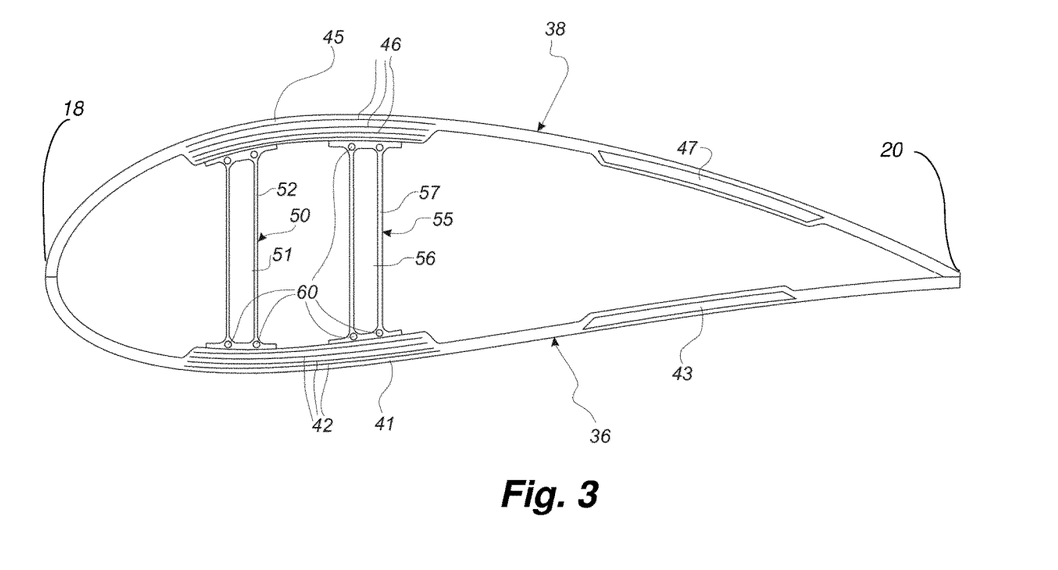
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points.

In order to compensate for this, a number of filler ropes 60 comprising glass fibres are normally arranged at these joint areas. Further, such ropes 60 will also facilitate transferring loads from the skin layers of the shear web body to the flanges. However, according to the invention, alternative constructional designs are possible.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

Figure 4:
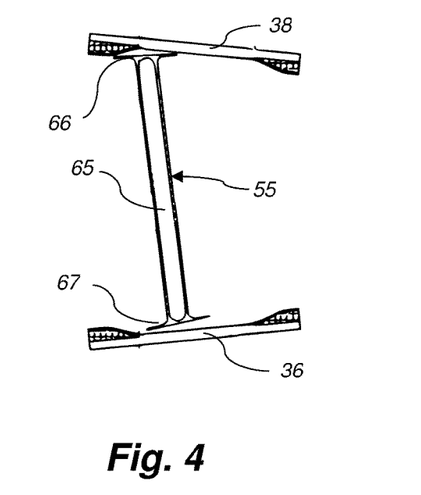
FIG. 4 is an example of a misaligned shear web using a prior art approach of blade manufacturing.
Figure 5:
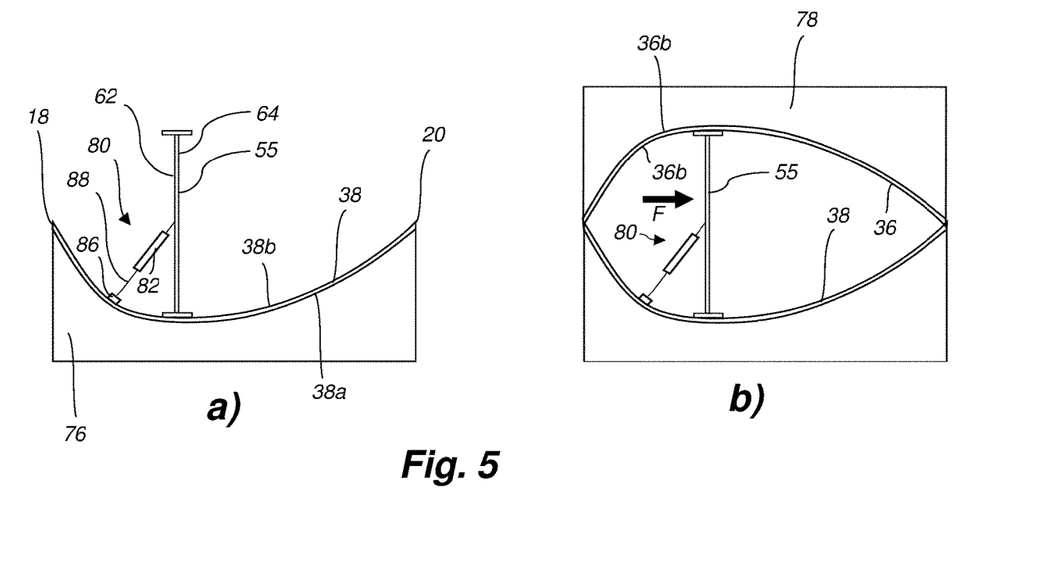
FIG. 5 illustrates a blade manufacturing process of the present invention.

FIG. 4 illustrates an example of a misaligned shear web 55 using a prior art approach of blade manufacturing. When an insufficient support of the shear web during blade closure and bonding is provided, this may result in a tilted shear web in which the mounting flanges 66, 67 are displaced from their predetermined bonding positions on the inner surfaces of shell halves 36, 38. This may lead to low quality bond lines and a dissatisfactory structural stability of the blade A method of manufacturing a wind turbine blade according to the present invention is illustrated in the schematic view of FIGS. 5*a* and 5*b*. A first shell half 38, such as a suction side shell half, is formed in blade mould 76, the shell half 38 comprising an aerodynamic outside surface 38*a* and an opposing inside surface 38*b*. A shear web 55 is arranged within the first shell half 38, the shear web comprises two opposing lateral surfaces 62, 64 extending in a spanwise direction of the blade. The shear web 55 is adhesively joined to the first and the second shell half at respective mounting flanges. As seen in FIG. 5*b*, the second shell half 36, which is formed in blade mould 78, is joined to the first shell half and to the shear web 55.

Figure 6:
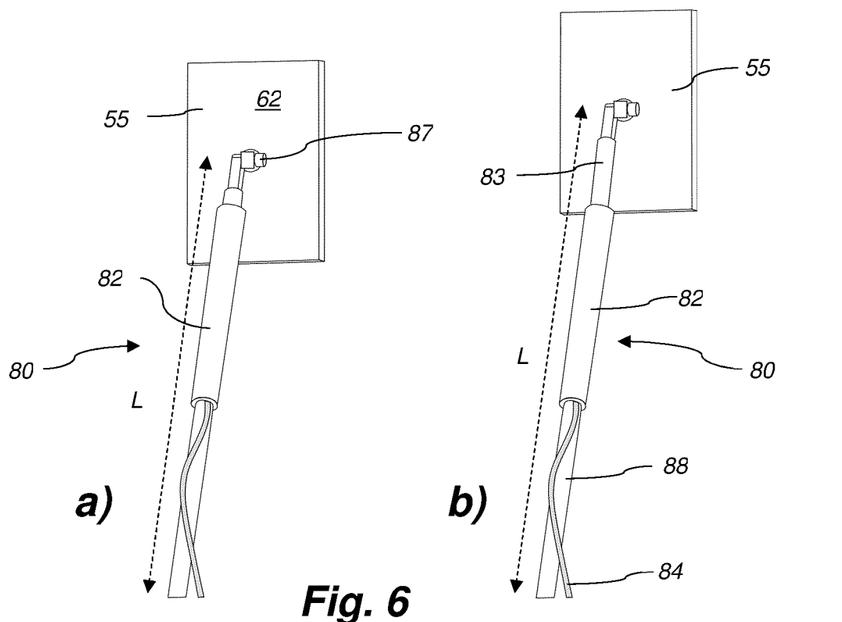
FIG. 6 is a partial perspective view of a telescopic support member according to the present invention.
Figure 7:
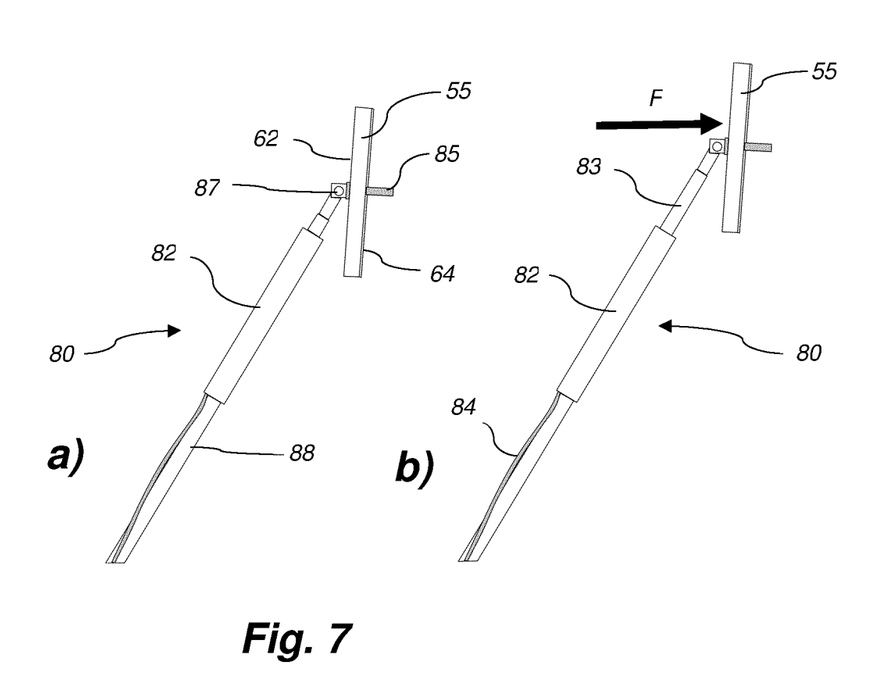
FIG. 7 is a partial side view of a telescopic support member according to the present invention.

The step of arranging the shear web 55 within the first shell half 38 comprises arranging a telescopic support member 80 between the inside surface 38*b* of the first shell half 38 and the lateral surface 62 of the shear web 55, wherein the telescopic support member 80 comprises an actuator 82 for adjusting the length of the telescopic support member, as illustrated in FIGS. 6 and 7. The actuator 82 is preferably a fluid-driven actuator, preferably a pneumatic cylinder. As seen in FIGS. 6 and 7, the actuator 82 is linked to a fluid supply line 84, such as an air supply line 84.

Figure 10:
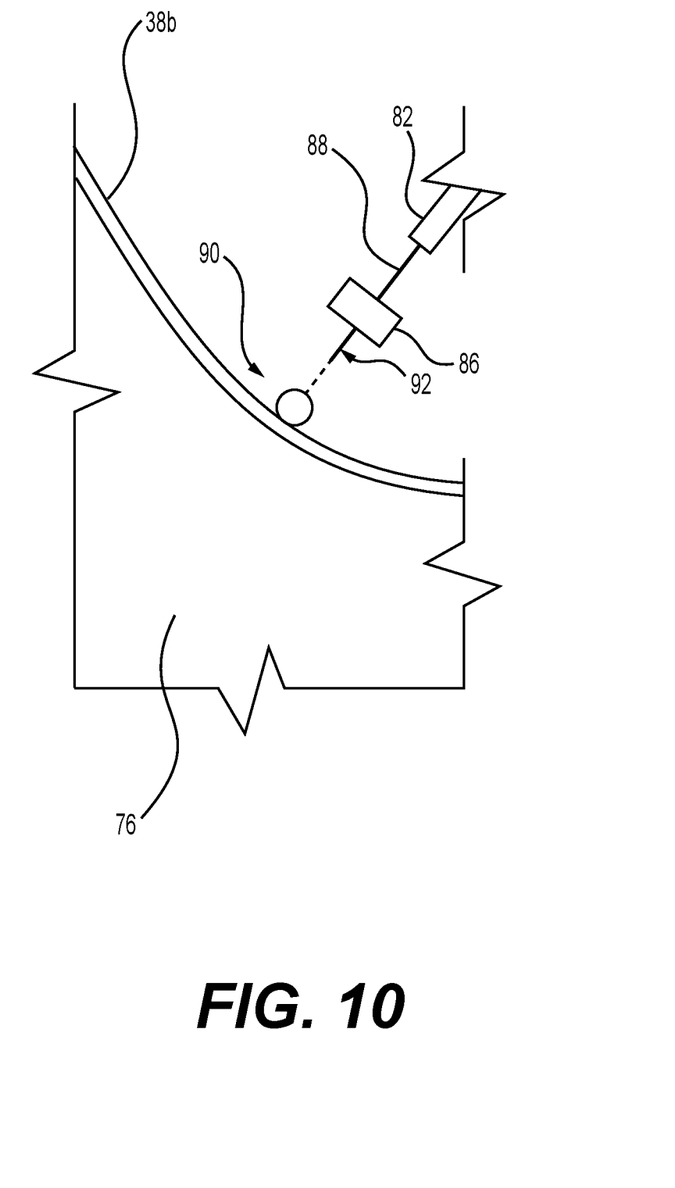
FIG. 10 illustrates an embodiment of the blade manufacturing process of FIG. 5.

The support member may comprise a foot portion 86, see FIG. 5, and a bar portion 88, wherein the actuator 82 is arranged distally adjacent to the bar portion 88. The foot portion 86 may be attached to an anchoring point provided on the inside surface 38*b* of the first shell half, wherein preferably the anchoring point comprising a polymer anchor glued to the inside surface of the first shell half, the polymer anchor comprising a loop 90 for receiving a mating pin 92 of the telescopic support member 80, as shown in FIG. 10.

As illustrated in FIG. 6*a* vs. 6*b*, and FIG. 7*a* vs. 7*b*, the step of adhesively joining the second shell half to the first shell half and to the one or more shear webs comprises increasing the length L of the telescopic support member for applying a force F on the lateral surface of the shear web. The force F pushes the shear web in a chordwise direction towards the trailing edge F of the blade to ensure full contact and optimal bond lines between the inside surfaces of the shell halves and the mounting flanges of the shear web.

As seen in FIGS. 6 and 7, the distal end of the piston rod 83 of actuator 82 may connect to a shaft 87, which is received in a suitable attachment device on lateral surface 62 of shear web 55. The attachment device may comprise a bolt 85 which extends through the main body of the shear web 55.

Figure 8:
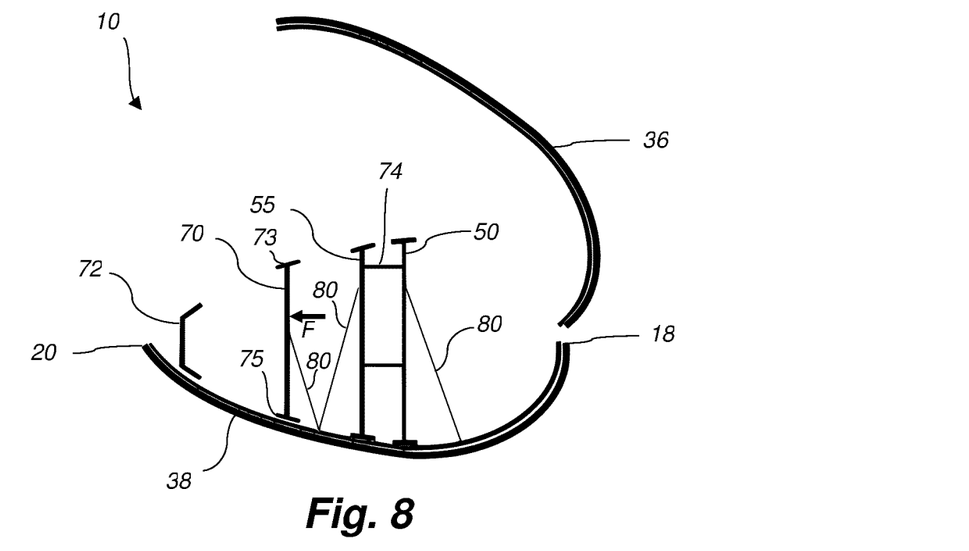
FIG. 8 is a schematic sectional view of a wind turbine blade according to the present invention.
Figure 9:
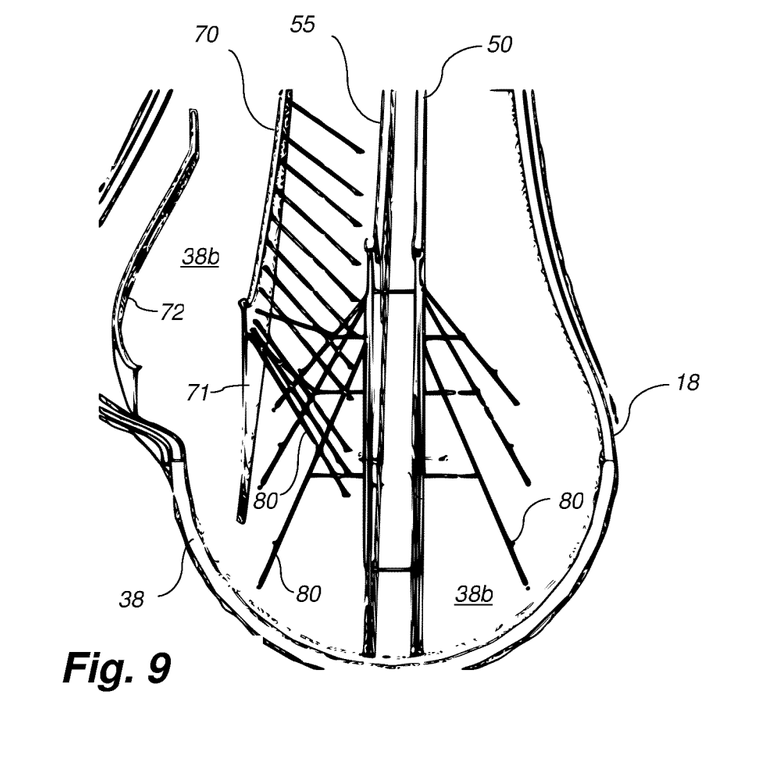
FIG. 9 is a partial perspective view of a part of a wind turbine blade during a manufacturing process according to the present invention.

As seen in FIGS. 8 and 9, a plurality of shear webs 50, 55, 70 may be arranged within the first shell half, and wherein the at least one telescopic support member 80 extends between the inside surface 38*b* of the first shell half and the lateral surface 71 of the shear web 70 which is closest to the trailing edge 20 of the blade among said plurality of shear webs. The blade 10 may further comprises a C-stiffener 72, which is not considered a shear web herein.

At least one telescopic support member 80 is arranged in contact with the inside surface 38*b* of the first shell half 38 at a location spaced in a chordwise direction from said shear web 70 which is closest to the trailing edge of the blade, such that said location is closer to the leading edge than said shear web. Shear web 70 comprises a first mounting flange 73 and a second mounting flange 75, the mounting flanges 73, 75 converging toward the trailing edge 20. Thereby, said shear web 70 can be pushed towards the trailing edge using the telescopic support member, thus ensuring correct placement and improved bond lines. The telescopic support member 80 is arranged only on one of the two opposing lateral surfaces 62, 64 of the shear web, namely the lateral surface 62 of the shear web that faces towards the leading edge 18 of the blade.

Afterwards, the support member 80 can be removed from the shear web and from the blade altogether preferably through the open root end of the blade as seen in FIG. 9. As seen in FIGS. 8 and 9, the point of contact between the telescopic support member and the lateral surface 71 of the shear web 70 is at the center of gravity of the shear web or higher, as seen in the vertical/flapwise direction.

The invention is not limited to the embodiments described herein, and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
36*a* aerodynamic outside surface
36*b* inside surface
38 suction side shell part
38*a* aerodynamic outside surface
38*b* inside surface
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 first lateral surface of shear web
64 second lateral surface of shear web
65 main body of shear web 66 first mounting flange
67 second mounting
70 third shear web
71 lateral surface of third shear web
72 C-stiffener
73 first mounting flange of third shear web
74 connector between shear webs
75 second mounting flange of third shear web
76 first mould
78 second mould
80 telescopic support member
82 actuator
83 piston rod
84 fluid supply line
85 bolt
86 foot portion
87 shaft
88 bar portion
H height
L length of support member
r distance from hub
R rotor radius

The invention claimed is:

1. A method of manufacturing a wind turbine blade (10), the blade having a profiled contour including a pressure side (36) and a suction side (38), and a leading edge (18) and a trailing edge (20) with a chord having a chord length extending therebetween, the wind turbine blade (10) extending in a spanwise direction between a root end (16) and a tip end (14), the method comprising the steps of:
forming a first shell half (38) and a second shell half (36), each of the first and second shell halves (38, 36) comprising an aerodynamic outside surface (38a, 36a) and an opposing inside surface (38b, 36b);
arranging one or more shear webs (50, 55, 70) within the first shell half, wherein the one or more shear webs comprises two opposing lateral surfaces (62, 64) extending in a spanwise direction;
adhesively joining the one or more shear webs to the first shell half; and
adhesively joining the second shell half to the first shell half and to the one or more shear webs,
wherein the step of arranging the one or more shear webs (50, 55, 70) within the first shell half comprises arranging at least one support member (80) between the inside surface (38b) of the first shell half (38) and the lateral surface (62) of the one or more shear webs (50, 55, 70), wherein the at least one support member (80) comprises an actuator (82) for adjusting the length (L) of the at least one support member (80), wherein the actuator (82) comprises a piston rod having a free end received in a fixation point on one of the lateral surfaces of the one or more shear webs,
wherein the at least one support member (80) is arranged at the one or more shear webs, and
wherein mounting flanges (73, 75) of the one or more shear webs are angled such that, when viewed in a chordwise direction, lines defining angles of the mounting flanges (73, 75) converge towards the trailing edge (20) of the wind turbine blade (10), such that a vertical or flapwise distance between the mounting flanges (73, 75) decreases in the chordwise direction towards the trailing edge.

2. The method according to claim 1, wherein the at least one support member (80) is a telescopic support member (80) and the actuator (82) is a fluid-driven actuator.

3. The method according to claim 2, wherein the actuator (82) is a pneumatic cylinder.

4. The method according to claim 1, wherein the step of adhesively joining the second shell half to the first shell half and to the one or more shear webs comprises biasing the one or more shear webs (70) towards the trailing edge of the wind turbine blade using the actuator of the at least one support member.

5. The method according to claim 1, wherein the step of adhesively joining the second shell half to the first shell half and to the one or more shear webs comprises increasing the length (L) of the at least one support member (80) for applying a force (F) on the lateral surface of the one or more shear webs.

6. The method according to claim 5, wherein said force (F) pushes the one or more shear webs (50, 55, 70) in the chordwise direction towards the trailing edge of the wind turbine blade.

7. The method according to claim 1, wherein the one or more shear webs comprise a plurality of shear webs (50, 55, 70) arranged within the first shell half, and wherein the at least one support member (80) extends between the inside surface (38b) of the first shell half and the lateral surface (71) of the one of the shear webs which is closest to the trailing edge (20) of the wind turbine blade among said plurality of shear webs.

8. The method according to claim 7, wherein the at least one support member (80) is arranged in contact with the inside surface (38b) of the first shell half (38) at a location spaced in the chordwise direction from said one of the shear webs which is closest to the trailing edge of the wind turbine blade, such that said location is closer to the leading edge than said one of the shear webs.

9. The method according to claim 1, the method further comprising removing the at least one support member (80) from the one or more shear webs after adhesively joining the second shell half to the first shell half and to the one or more shear webs.

10. The method according to claim 1, wherein one or more anchoring points are provided on the inside surface (38b) of the first shell half, the one or more anchoring points comprising a polymer anchor glued to the inside surface of the first shell half, the polymer anchor comprising a loop for receiving a mating pin of the at least one support member.

11. The method according to claim 1, wherein the at least one support member (80) is arranged only on one of the two opposing lateral surfaces (62, 64) of the one or more shear webs.

12. The method according to claim 11, wherein the at least one support member (80) is arranged only on the lateral surface (62) of the one or more shear webs that faces towards the leading edge (18) of the wind turbine blade.

13. The method according to claim 1, wherein a point of contact between the at least one support member and the lateral surface of the one or more shear webs is at a center of gravity of the one or more shear webs or higher, as seen in the vertical or flapwise direction.

14. The method according to claim 1, wherein the at least one support member further comprises a regulator for associating the length of the at least one support member with an angle of the one or more shear webs with a horizontal plane.

15. A wind turbine blade (10) comprising:
a first shell half (38) and a second shell half (36) joined together and defining an internal cavity therebetween, each of the first and second shell halves (38, 36) comprising an aerodynamic outside surface (38a, 36a) and an opposing inside surface (38b, 36b);

one or more shear webs (50, 55, 70) arranged in the internal cavity, wherein each of the one or more shear webs comprises two opposing lateral surfaces (62, 64) extending in a spanwise direction; and at least one removable support member (80) arranged between the inside surface of the first shell half and the lateral surface of the one or more shear webs, wherein the at least one removable support member (80) comprises an actuator (82) for adjusting a length of the at least one removable support member (80), wherein the actuator (82) comprises a piston rod having a free end received in a fixation point on one of the lateral surfaces of the one or more shear webs, wherein the at least one removable support member (80) is arranged at the one or more shear webs, and wherein mounting flanges (73, 75) of the one or more shear webs are angled such that, when viewed in a chordwise direction, lines defining angles of the mounting flanges (73, 75) converge towards the trailing edge (20) of the wind turbine blade (10), such that a vertical or flapwise distance between the mounting flanges (73, 75) decreases in the chordwise direction towards the trailing edge.

16. The wind turbine blade (10) according to claim 15, wherein the at least one removable support member is attached to an inboard portion of the one or more shear webs that is accessible from a root end of the wind turbine blade.

* * * * *